US009140229B2

(12) United States Patent
Imamura et al.

(10) Patent No.: US 9,140,229 B2
(45) Date of Patent: Sep. 22, 2015

(54) KNOCKING CONTROL SYSTEM FOR GAS ENGINE

(75) Inventors: Tsukasa Imamura, Kobe (JP); Tomohiko Sugimoto, Kobe (JP); Tetsuo Tokuoka, Kobe (JP); Hiroyoshi Ishii, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 257 days.

(21) Appl. No.: 13/122,338

(22) PCT Filed: Sep. 1, 2009

(86) PCT No.: PCT/JP2009/004285
§ 371 (c)(1),
(2), (4) Date: May 2, 2011

(87) PCT Pub. No.: WO2010/038355
PCT Pub. Date: Apr. 8, 2010

(65) Prior Publication Data
US 2011/0224889 A1 Sep. 15, 2011

(30) Foreign Application Priority Data

Oct. 2, 2008 (JP) ................................. 2008-257773

(51) Int. Cl.
*F02D 35/02* (2006.01)
*F02P 5/152* (2006.01)
(Continued)

(52) U.S. Cl.
CPC ............... *F02P 5/152* (2013.01); *F02B 19/108* (2013.01); *F02B 19/12* (2013.01); *F02D 19/024* (2013.01);
(Continued)

(58) Field of Classification Search
CPC ..... Y02T 10/46; G01L 23/225; G01L 23/221; G01L 23/227; F02P 5/152; F02P 5/1522; F02D 2041/1432; F02D 35/027; F02D 2200/1015
USPC .......... 123/406.23, 434, 435, 406.16, 406.21, 123/406.29, 406.34, 406.38, 406.39; 701/111
See application file for complete search history.

(56) References Cited

U.S. PATENT DOCUMENTS 4,409,937 A * 10/1983 Asano ....................... 123/406.38
5,163,405 A * 11/1992 Ahern et al. ................... 123/435
(Continued)

FOREIGN PATENT DOCUMENTS

JP 64-069730 3/1989
JP 04-101068 4/1992
(Continued)

OTHER PUBLICATIONS

ISA Japanese Patent Office, International Search Report of PCT/JP2009/004285, Oct. 6, 2009, 2 pages.

*Primary Examiner* — Hai Huynh
*Assistant Examiner* — Gonzalo Laguarda
(74) *Attorney, Agent, or Firm* — Alleman Hall McCoy Russell & Tuttle LLP

(57) ABSTRACT

A knocking control system comprises a knocking determiner device for determining whether or not knocking with a predetermined intensity or higher has occurred in a cylinder of a gas engine in each cycle; an integration variable calculator which adds to an integration variable CT when the knocking determiner device determines that the knocking with the predetermined intensity or higher has occurred, and subtracts from the integration variable CT when the knocking determiner determines that the knocking with the predetermined intensity or higher has not occurred; and a main controller for reducing a power output of the cylinder if the integration variable CT is not less than a threshold.

4 Claims, 5 Drawing Sheets

(51) Int. Cl.
  *F02B 19/10* (2006.01)
  *F02B 19/12* (2006.01)
  *F02P 5/153* (2006.01)
  *F02D 19/02* (2006.01)
  *F02D 41/00* (2006.01)
  *F02P 5/04* (2006.01)
  *F02P 13/00* (2006.01)
  *F02M 21/02* (2006.01)

(52) U.S. Cl.
  CPC ......... *F02D 35/027* (2013.01); *F02M 21/0284* (2013.01); *F02P 5/153* (2013.01); *F02D 35/023* (2013.01); *F02D 41/0027* (2013.01); *F02M 21/0275* (2013.01); *F02M 21/0278* (2013.01); *F02P 5/045* (2013.01); *F02P 13/00* (2013.01); *Y02T 10/125* (2013.01); *Y02T 10/32* (2013.01); *Y02T 10/46* (2013.01)

(56) References Cited

U.S. PATENT DOCUMENTS

| | | | |
|---|---|---|---|
| 7,324,890 B2 * | 1/2008 | Fujiwara et al. | 701/111 |
| 7,478,624 B2 * | 1/2009 | Kaneko et al. | 123/406.37 |
| 7,546,834 B1 * | 6/2009 | Ulrey et al. | 123/525 |
| 8,103,432 B2 * | 1/2012 | Saito | 701/111 |
| 2011/0259298 A1 * | 10/2011 | Imamura et al. | 123/436 |

FOREIGN PATENT DOCUMENTS

| | | |
|---|---|---|
| JP | 2001-082304 A | 3/2001 |
| JP | 2005-315097 A | 11/2005 |
| JP | 2007-247569 A | 9/2007 |

* cited by examiner

KNOCKING CONTROL SYSTEM FOR GAS ENGINE

TECHNICAL FIELD

The present invention relates to a knocking control system for a gas engine using a gas fuel such as natural gas, city-supplied gas, etc.

BACKGROUND ART

In recent years, in factories, electric power systems have been provided that use both electric power supplied via power lines from a power company, and also electric power generated by a power generator driven by a gas engine installed within the factory. Gas engines have a high energy efficiency when they conduct combustion in a fuel lean state, and are suitable for use in power generation equipment operating with a constant load. However, in gas engines, abnormal combustion such as knocking may occur during its operation. Knocking is a phenomenon in which an uncombusted air-fuel mixture is self-ignited in a combustion stroke and combustion occurs before the flame propagates or the spark timing. A pressure wave generated at the time of self-ignition imposes a burden on the engine, and as a result, the engine could be damaged. For this reason, it is necessary to properly control engine power output to suppress the occurrence of knocking with a specified intensity or higher.

Japanese Laid-Open Patent Application Publication No. 2007-247569 discloses a knocking control system for preventing occurrence of knocking in a gas engine. This control system calculates an occurrence ratio with which knocking to be evaluated occurs for set cycles, and reduces a fuel feed amount to the corresponding cylinder if the calculated occurrence ratio of the knocking exceeds a predetermined occurrence ratio. In accordance with this control system, it is possible to suppress occurrence of knocking in a gas engine.

SUMMARY OF THE INVENTION

Technical Problem

However, in the control system disclosed in the above publication, a status of occurrence of the knocking is not reflected in the control of the fuel feed amount before the set number of cycles lapse and the occurrence ratio of knocking is calculated. Therefore, the knocking control is retarded and the control response is not high. As a result, the knocking cannot be avoided correctly. Even if knocking occurs continuously and a cylinder temperature rises, control for reducing the fuel feed amount is not executed before the occurrence ratio of knocking for the set cycles exceeds a predetermined occurrence ratio. Therefore, occurrence of the knocking cannot be suppressed sufficiently, and a thermal load of the engine becomes excessive. Moreover, if a fuel feed amount to a single cylinder is reduced, other cylinders would overloaded to maintain a power output for the overall engine.

Accordingly, an object of the present invention is to provide a control system which has a high control response, is capable of sufficiently suppressing occurrence of knocking and prevents an engine cylinder from being placed under a thermal overload.

Solution to Problem

A knocking control system for a gas engine of the present invention comprises a knocking determiner for determining whether or not knocking with a predetermined intensity or higher has occurred in a cylinder of the gas engine in each cycle; an integration variable calculator which adds a predetermined number to an integration variable when the knocking determiner determines that the knocking with the predetermined intensity or higher has occurred, and subtracts a predetermined number from the integration variable when the knocking determiner determines that the knocking with the predetermined intensity or higher has not occurred; and a controller for reducing a power output of the cylinder if the integration variable is not less than a threshold.

In accordance with this configuration, the number of occurrences of the knocking with the predetermined intensity or higher is added cumulatively to the integration variable, and the power output of the cylinder is reduced when the resulting integration variable reaches a value which is not less than the threshold. Therefore, a status of occurrence of the knocking is reflected for control of the power output of the cylinder without awaiting a lapse of a certain number of cycles. Thus, control which does not cause a delay is implemented in the knocking control and a control response is improved. Even when the knocking determiner determines that the knocking with the predetermined intensity or higher has not occurred, the integration variable is not reset but the predetermined number is subtracted from the integration variable. Therefore, if the knocking occurs intensively for a moment, the integration variable reaches a value which is not less than the threshold, and occurrence of the knocking is suppressed quickly.

The controller may reduce a fuel feed period of the cylinder to reduce the power output of the cylinder if the integration variable is not less than the threshold.

In accordance with this configuration, since an excess air ratio in the air-fuel mixture fed to the cylinder of the gas engine increases, the power output of the cylinder is reduced and occurrence of knocking is suppressed. It should be noted that the power output of the cylinder may be reduced by controlling a fuel feed pressure.

The controller may retard an ignition timing of the cylinder if the knocking with the predetermined intensity or higher which is determined by the knocking determiner has occurred a predetermined number of times or more for a set number of cycles.

In accordance with this configuration, even if the knocking occurs frequently in a state where the integration variable is less than the threshold, occurrence of the knocking can be suppressed by retarding the ignition timing. In a case where a power output efficiency is reduced by retarding the ignition timing, the power output of the cylinder may be reduced by retarding the ignition timing.

The gas engine may include a plurality of cylinders, and the controller may decrease a power output upper limit value of the gas engine if the number of cylinders in which the integration variable is not less than a predetermined threshold exceeds a predetermined number.

For example, in a case where control for reducing the power output is executed simultaneously for a plurality of cylinders among all cylinders, there is a possibility that the load increases in the remaining cylinders to achieve a target power output in an overall engine, which may possibly induce knocking in the remaining cylinders. However, in accordance with the above configuration, in a case where the control for reducing the power output is executed simultaneously for a plurality of cylinders which are more than the predetermined number, the power output upper limit value of the gas engine is decreased. Therefore, it is possible to prevent the knocking from being induced in the remaining cylinders, and to prevent these cylinders from being overloaded.

DESCRIPTION OF EMBODIMENTS

Hereinafter, an embodiment of the present invention will be described with reference to the drawings.

Figure 1:
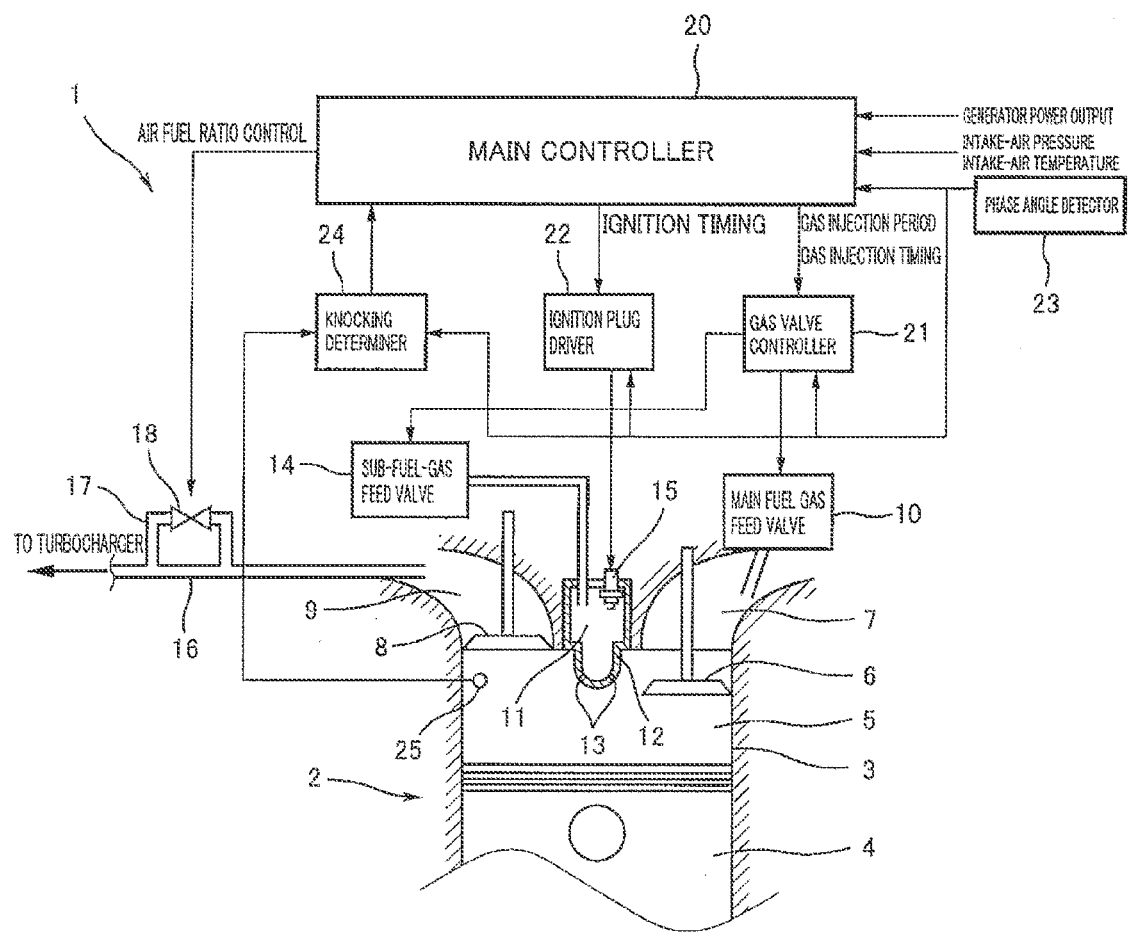
FIG. 1 is a view showing a configuration of a knocking control system for a gas engine according to an embodiment of the present invention.

FIG. 1 is a view showing a configuration of a knocking control system 1 of a gas engine 2 according to an embodiment of the present invention. As shown in FIG. 1, the gas engine 2 is a reciprocating multi-cylinder four-stroke engine which uses as a main fuel a gas fuel such as natural gas, city-supplied gas, etc., and is used as a prime mover of power generation equipment. In FIG. 1, a single cylinder 3 in the gas engine 2 is depicted as a representative example, but other cylinders which are not shown have the same configuration.

A piston 4 is reciprocatably inserted into the cylinder 3. The piston 4 is coupled to a crankshaft (not shown) which is an output shaft. A main combustion chamber 5 is formed above the piston 4 inside the cylinder 3. An intake port 7 is coupled to the main combustion chamber 5 via intake valve(s) 6, and exhaust port 9 is coupled to the main combustion chamber 5 via exhaust valve(s) 8. A main fuel gas feed valve 10 for injecting a gas fuel is provided inside the intake port 7. A sub-combustion chamber 11 is adjacent to the main combustion chamber 5. The sub-combustion chamber 11 is separated from the main combustion chamber 5 by a separating wall 12, and connects with the main combustion chamber 5 through a connection hole 13 formed in the separating wall 12. In the sub-combustion chamber 11, a sub-fuel gas feed valve 14 for injecting the gas fuel and an ignition plug 15 for combusting an air-fuel mixture are provided.

In accordance with the gas engine 2, in an intake stroke, an air-fuel mixture containing air and the gas fuel injected by the main fuel gas feed valve 10 is supplied from the intake port 7 to the main combustion chamber 5, while the air-fuel mixture containing the gas fuel injected by the sub-fuel gas feed valve 14 is supplied to the sub-combustion chamber 11. In a compression stroke, the air-fuel mixture is compressed in the main combustion chamber 5 and the sub-combustion chamber 11, and then the ignition plug 15 operates at a predetermined timing to ignite the air-fuel mixture in the sub-combustion chamber 11. A flame generated in the sub-combustion chamber 11 propagates to an interior of the main combustion chamber 5 through the connection hole 13, to ignite the air-fuel mixture in the main combustion chamber 5. Thereby, the piston 4 moves downward (expansion stroke). Then, in an exhaust stroke, a gas is exhausted from the main combustion chamber 5 to outside of the combustion chamber via the exhaust port 9. An exhaust passage 16 is coupled to the exhaust port 9 and coupled to a turbocharger, which is not shown. An exhaust bypass valve 18 is provided in a bypass passage 17 provided at the exhaust passage 16 to control an intake-air pressure.

The gas engine 2 operates in such a manner that it progresses through the above four strokes as one cycle. During one cycle, the piston 4 reciprocates twice and the crankshaft rotates twice. A position of the piston 4, or a rotational angle (crank angle) of the crankshaft during one cycle, is treated as a phase angle of the gas engine 2.

The knocking control system 1 includes a main controller 20 (controller) including a CPU, a memory, and an input/output interface. A program for the knocking control as described later is stored in the memory and executed by the CPU.

The main controller 20 is coupled to a gas valve controller 21 for driving the main fuel gas feed valve 10 and the sub-fuel gas feed valve 14, and outputs a command signal to the gas valve controller 21 to drive the fuel gas feed valves 10 and 14. The main controller 20 is coupled to an ignition plug driver 22 for driving the ignition plug 15. The main controller 20 outputs a command signal to the plug driver 22 to drive the ignition plug 15, thereby controlling an ignition timing of the air-fuel mixture. The control for driving the fuel gas feed valves 10 and 14 and the ignition plug 15 is performed independently for each cylinder 3.

The knocking control system 1 includes a phase angle detector 23 for detecting a phase angle of the gas engine 2. Phase angle information from the phase angle detector 23 is input to the main controller 20. The phase angle detector 23 may be constituted by an electromagnetic pickup, a proximity switch or a rotary encoder.

The knocking control system 1 includes a knocking determiner device 24 (knocking determiner) for detecting the occurrence of knocking. The phase angle detector 23 and a cylinder internal pressure sensor 25 for detecting an internal pressure of the cylinder 3 are coupled to the knocking determiner device 24. The knocking determiner device 24 detects a cycle of the gas engine 2 based on the phase angle information from the phase angle detector 23, and determines whether a combustion state in the cylinder 3 is "normal", "misfire", "light knocking", or "heavy or medium knocking" in every cycle based on a pressure fluctuation in the interior of the cylinder 3. The cylinder internal pressure sensor 25 is provided individually for each cylinder 3. The knocking determiner device 24 individually determines the combustion state of each cylinder 3. The main controller 20 receives as an input a result of the determination made by the knocking determiner device 24.

The main controller 20 receives as additional inputs a generator power output, an intake-air pressure, an intake-air temperature, etc. The main controller 20 controls an opening degree of the exhaust bypass valve 18 so that a predetermined intake-air pressure is attained with respect to the generator power output. The gas valve controller 21 controls an injecting pressure of the gas fuel so that the injecting pressure is a predetermined value or larger than the intake-air pressure. Thereby, the main fuel gas feed valve 10, which is an electromagnetic valve, opens and closes stably regardless of a magnitude of the intake-air pressure.

Figure 2:
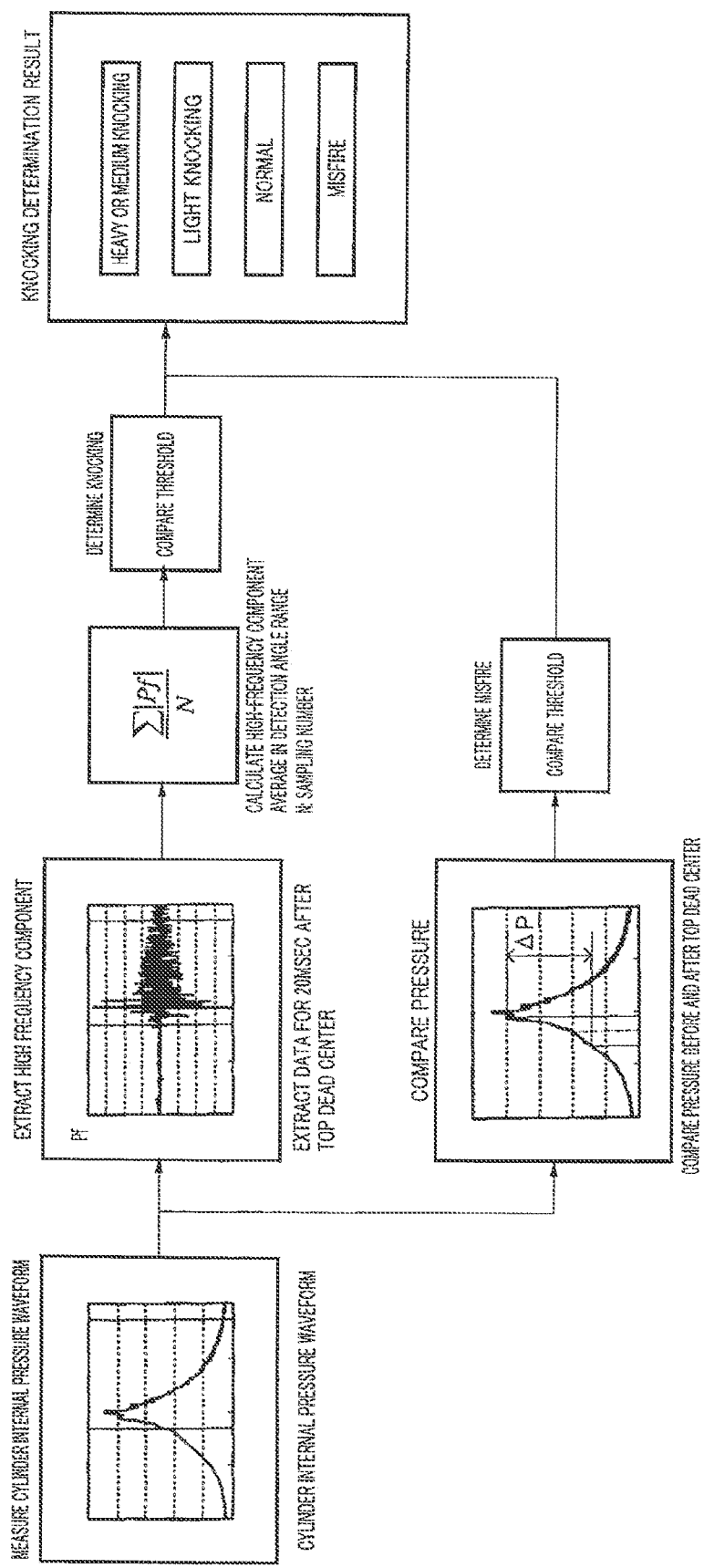
FIG. 2 is a view showing a combustion state determination executed by a knocking determiner of FIG. 1.

FIG. 2 is a view showing combustion state determination executed by the knocking determiner device 24 of FIG. 1. As shown in FIG. 2, when the cylinder internal pressure sensor 25 measures a waveform of the cylinder internal pressure, the knocking determiner device 24 filters this waveform to extract a high-frequency component. A range of extraction of data is set to a predetermined time (e.g., 20 msec) after the piston reaches top dead center. The high-frequency component within this time is sampled in plural number (N). An average value of pressures Pf of the sampled components is calculated. If this average value is not less than a first threshold, it is determined that the combustion state of the cylinder is "heavy or medium knocking", while if this average value is less than the first threshold and not less than a second threshold, it is determined that the combustion state of the cylinder is "light knocking" (second threshold is smaller than the first threshold). "Light knocking" and "heavy or medium knocking" mean that the knocking is occurring in the cylinder 3. "Heavy or medium knocking" indicates that a knocking with a predetermined intensity or higher is occurring, while "light knocking" indicates that a knocking with an intensity lower than the predetermined intensity is occurring.

When the cylinder internal pressure sensor 25 measures a waveform of the cylinder internal pressure, the knocking determiner device 24 compares cylinder internal pressures before and after top dead center and determines whether or not a pressure deviation ΔP derived by the comparison exceeds a threshold. If the pressure deviation ΔP is less than the threshold, it is determined that the combustion state of the cylinder is "misfire", while if the pressure deviation ΔP is not less than the threshold and the above average value is less than the second threshold, it is determined that the combustion state of the cylinder is "normal".

Figure 3:
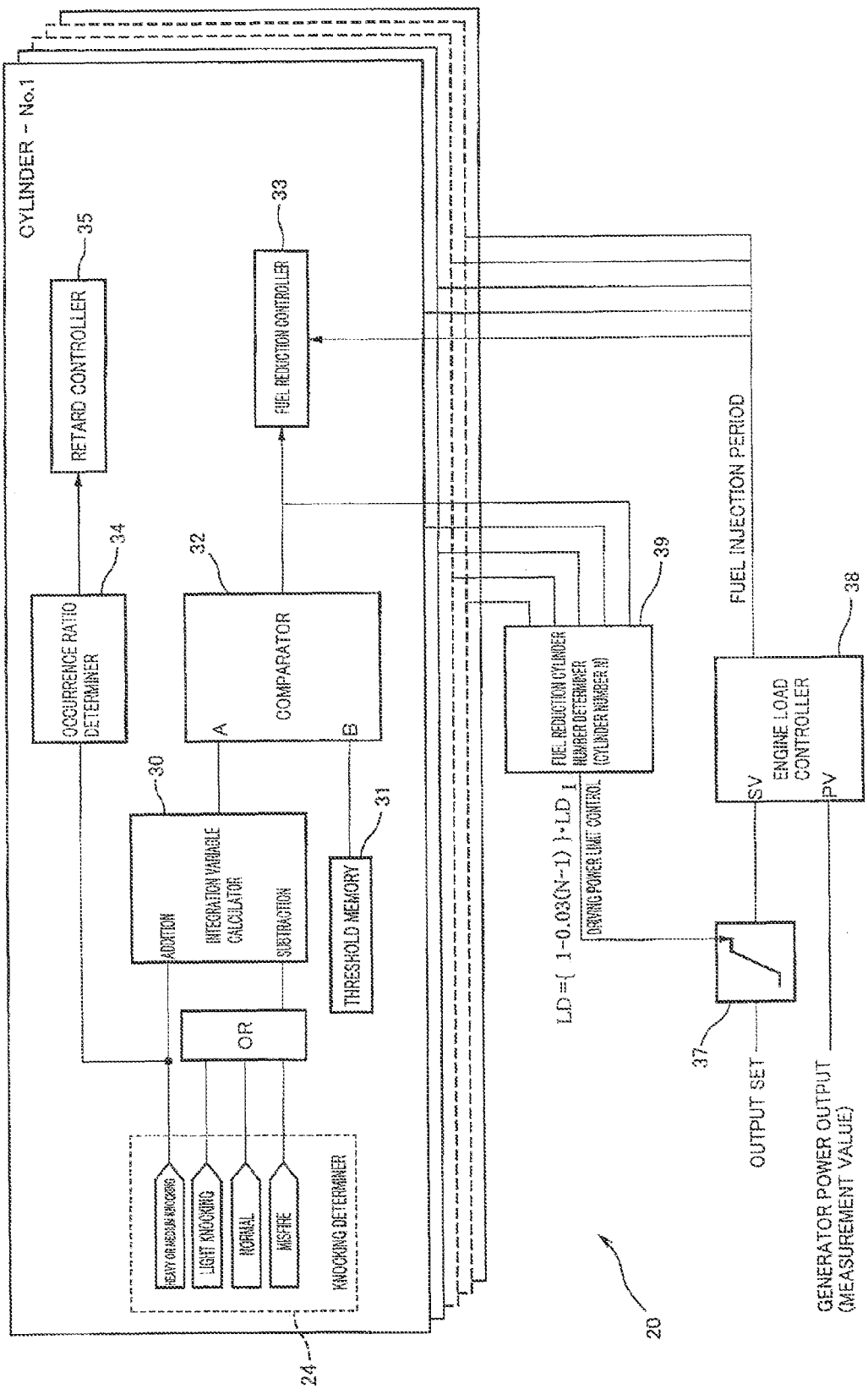
FIG. 3 is a functional block diagram relating to knocking control of a main controller of FIG. 1.

FIG. 3 is a functional block diagram relating to the knocking control of the main controller 20 of FIG. 1. In FIG. 3, functions performed individually for each cylinder are depicted in the upper side of FIG. 3 and functions executed totally for all of the cylinders are depicted in the lower side of FIG. 3. As shown in FIG. 3, the main controller 20 includes an integration variable calculator 30, a threshold memory 31, a comparator 32, a fuel reduction controller 33, an occurrence ratio determiner 34, an ignition retard controller 35, a power output limiter 37, an engine load controller 38, and a fuel reduction cylinder number determiner 39.

When the integration variable calculator 30 receives "heavy or medium knocking" as an input from the knocking determiner device 24, it adds 1 to an integration variable CT. When the integration variable calculator 30 receives "light knocking", "normal", or "misfire" as an input from the knocking determiner device 24, it subtracts 1 from the integration variable CT. The comparator 32 compares the integration variable CT to a predetermined threshold stored in the threshold memory 31, and determines whether or not the integration variable CT is not less than the threshold. If the comparator 32 determines that the integration variable CT is not less than the threshold, the fuel reduction controller 33 executes control for reducing a valve opening period of the main fuel gas feed valve 10 (see FIG. 1), i.e., a fuel injection period. The predetermined threshold stored in the threshold memory 31 may be preferably 3, 2, or another number.

The occurrence ratio determiner 34 determines whether or not "heavy or medium knocking" has occurred a predetermined number of times or more for a predetermined set number of cycles. To be specific, the occurrence ratio determiner 34 may determine whether or not "heavy or medium knocking" has occurred twice or more for 50 cycles of the engine 2. If it is determined that "heavy or medium knocking" has occurred twice or more for 50 cycles, the ignition retard controller 35 executes control for retarding an ignition timing. As known, a power output of the cylinder decreases if the ignition timing is retarded while the power output of the cylinder increases if the ignition timing is advanced.

The power output limiter 37 sets a power output upper limit value of the gas engine 2 (see FIG. 1). Note that the power output of the gas engine 2 is a power output of a power generator (not shown) coupled to the gas engine 2. The engine load controller 38 controls the fuel injection period of the main fuel gas feed valve 10 so that a power output measurement value of the power generator (not shown) is close to a power output set value input via the power output limiter 37. The fuel reduction cylinder number determiner 39 calculates the number N of cylinders for which the control for reducing the fuel injection period is executed, and decreases the power output upper limit value of the power output limiter 37 if the number N exceeds a predetermined number. To be specific, when an initial power output upper limit value of the power output limiter 37 is $LD_1$, the power output upper limit value LD may be set according to a following formula. That is, as the number N of the cylinders for which the control is executed simultaneously by the fuel reduction controller 33 increases, the power output upper limit value is weighted to decrease by 3%.

$$LD=\{1-0.03(N-1)\} \cdot LD_1 \tag{Formula 1}$$

Figure 4:
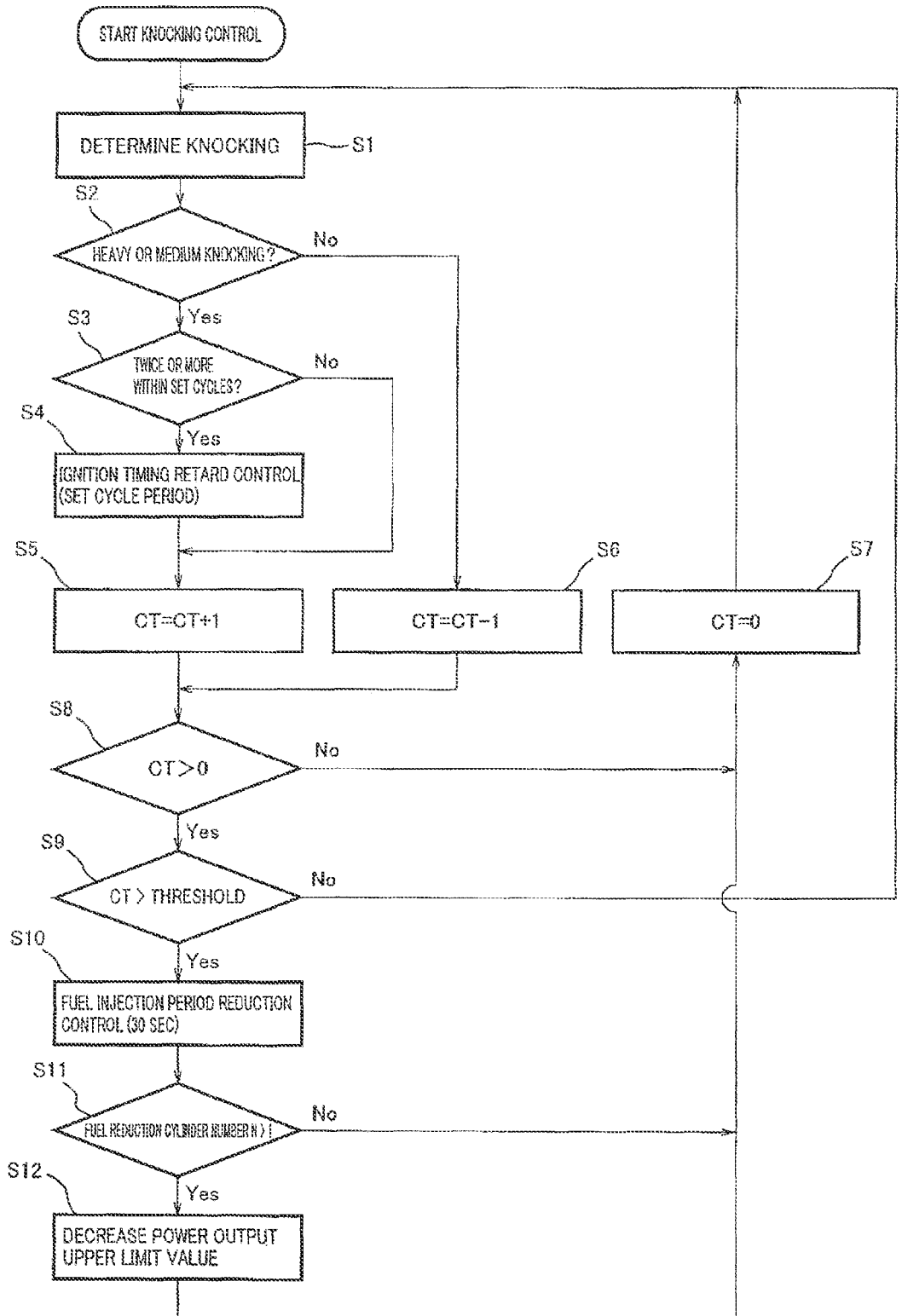
FIG. 4 is a flowchart showing the knocking control executed by the main controller of FIG. 1.
Figure 5:
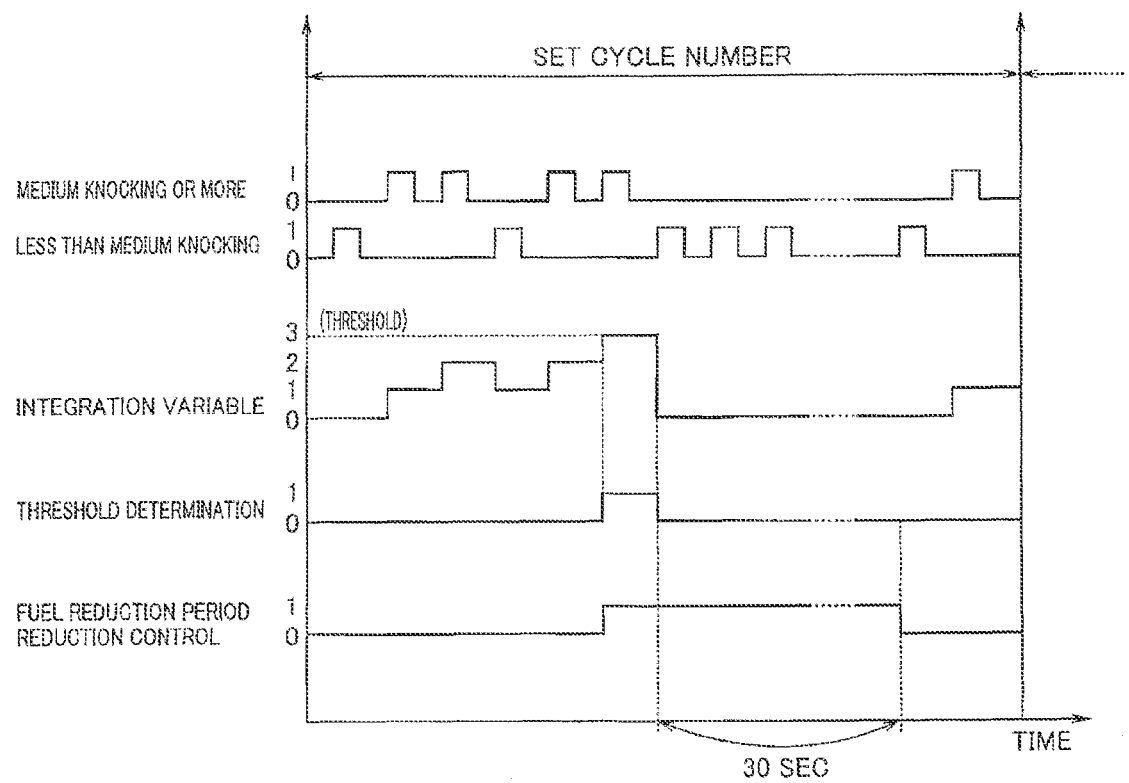
FIG. 5 is a timing chart showing fuel injection time reduction control in the knocking control executed by the main controller of FIG. 1.

FIG. 4 is a flowchart showing the knocking control executed by the main controller 20 of FIG. 1. FIG. 5 is a timing chart showing fuel injection time reduction control in the knocking control executed by the main controller 20 of FIG. 1. With reference to FIGS. 3 and 5, and along with FIG. 4, a flow of the knocking control will be described. As shown FIGS. 3 and 4, the knocking determiner device 24 determines whether the combustion state of the cylinder 3 of the gas engine 2 is "normal", misfire", "light knocking", or "heavy or medium knocking" in each cycle (step S1).

Then, if the knocking determiner device 24 determines that the combustion state is "heavy or medium knocking" (step S2), the occurrence ratio determiner 34 determines whether or not "heavy or medium knocking" has occurred a predetermined number of times (e.g., twice) or more for set number of cycles (e.g., 50 cycles) (step S3). If Yes in step S3, the ignition retard controller 35 executes control for retarding the ignition timing for the cycles of the set number of cycles (e.g., 50 cycles) (step S4). If No in step S3, the process moves to step S5.

Then, as shown in FIGS. 3 to 5, the integration variable calculator 30 adds 1 to the integration variable CT (step S5). An initial value of the integration variable CT is zero. If No in step S2, the integration variable calculator 30 subtracts 1 from the integration variable CT (step S6). Then, the integration variable calculator 30 determines whether or not the integration variable CT is larger than zero (step S8). If No in step S8, zero is assigned to the integration variable CT and the process moves to step S1 (step S7).

If Yes in step S8, the comparator 32 determines whether or not the integration variable CT is not less than a predetermined threshold (e.g., 3) (step S9). If No in step S9, the process returns to step S1. If Yes in step S9, the fuel reduction controller 33 executes control for reducing the fuel injection period in one cycle of the main fuel gas feed valve 10 (see FIG. 1) (step S10). If an event that the integration variable CT becomes a value which is not less than the threshold (e.g., 3) for a following predetermined time (e.g., 30 seconds) does not occur, the fuel reduction controller 33 stops the fuel injection period reduction control and restores the fuel injection period to a normal one.

Then, as shown in FIGS. 3 and 4, the fuel reduction cylinder number determiner 39 determines whether or not the number N of cylinders for which the fuel injection period reduction control has been executed, among all of the cylinders, is larger than a predetermined value (e.g., 1) (step S11). If No in step S11, zero is assigned to the integration variable CT and the process returns to step S1 (step S7). If Yes in step S11, the power output limiter 37 executes the power output limit control for reducing the power output upper limit value of the gas engine 2 (see FIG. 1) using the formula 1 (see FIG.

1) (step S12). After the power output upper limit value is reduced, zero is assigned to the integration variable CT (step S7), and the process returns to step S1.

In accordance with the above configuration, the number of occurrence of the knocking with the predetermined intensity or higher is added cumulatively to the integration variable CT, and if the integration variable CT reaches a value which is not less than the threshold, the fuel injection period is reduced by the fuel reduction controller 33. Therefore, a status of occurrence of the knocking is reflected for the power output control of the cylinder 3 without awaiting a lapse of the set number of cycles. This prevents the knocking control from being retarded and improves control response. Even when the knocking determiner device 24 determines that the knocking with the predetermined intensity or higher has not occurred, the integration variable CT is not reset, but the predetermined number (e.g., 1) is subtracted from the integration variable CT. Therefore, in a case where the knocking occurs intensively for a moment, the integration variable CT reaches a value which is not less than the threshold quickly, and thus, occurrence of the knocking is sufficiently suppressed.

Further, if the knocking with the predetermined intensity or higher determined by the knocking determiner device 24 has occurred the predetermined number of times (e.g., twice) or more for the set number of cycles, the ignition retard controller 35 retards the ignition timing of the corresponding cylinder 3. Therefore, even in a case where the knocking occurs frequently in a state where the integration variable CT is less than the threshold, occurrence of the knocking is suppressed.

In a case where the fuel injection period reduction control is executed simultaneously for the plural cylinders 3, among all the cylinders of the gas engine 2, there is a possibility that a load placed on the remaining cylinders increases to achieve a target power output in an overall gas engine 2 and knocking is induced in the remaining cylinders, or an excessive load is placed on the remaining cylinders. However, in the present invention, if the number of the cylinders 3, in which the integration variable CT reaches a value which is not less than the threshold, exceeds a predetermined number (e.g., 1), the power output limiter 37 decreases the power output upper limit value LD of the gas engine 2. This prevents the knocking from being induced in the remaining cylinders and an overload from occurring in the remaining cylinders.

Although in this embodiment, a so-called sub-combustion chamber and spark ignition method in which the ignition plug 15 ignites the air-fuel mixture in the sub-combustion chamber 11 is used as a method for igniting the air-fuel mixture, other methods may be used. For example, a so-called pilot fuel injection method may be used, in which a gas engine is provided with a pilot fuel injection valve for injecting a high-pressure gas fuel and a high-pressure gas fuel is injected by the pilot fuel injection valve to a compressed air-fuel mixture in the combustion chamber.

The invention claimed is:

1. A knocking control system for a gas engine including a plurality of cylinders for power generation comprising:
a main controller including:
a knocking determiner for determining whether or not knocking with a predetermined intensity or higher has occurred in each cylinder of the gas engine in each cycle;
a counter calculator, setting a counter individually for each cylinder, which adds a predetermined number to the counter when the knocking determiner determines that the knocking with the predetermined intensity or higher has occurred, and subtracts a predetermined number from the counter when the knocking determiner determines that the knocking with the predetermined intensity or higher has not occurred;
a power output reduction controller which controls a power output of each cylinder based on the counter corresponding to each cylinder by reducing a power output of the cylinder if the counter is not less than a predetermined threshold;
a power output limiter which sets a total power output upper limit value of the gas engine;
a power output reduction cylinder number determiner which calculates a number N of cylinders in a cycle for which the control of the power output by the power output reduction controller is performed, and decreases the total power output upper limit value of the power output limiter if the number N is more than one and exceeds a predetermined number; and
an engine load controller which controls the gas engine such that, after the total power output upper limit value has been decreased, if a power output measurement value of the as engine exceeds the total power output upper limit value, a total power output of the gas engine is reduced by the engine load controller, and if the power output measurement value of the as engine does not exceed the total power output upper limit value, the total power output of the gas engine is not reduced by the engine load controller, so that the total power output of the as engine is allowed to increase after the total power output upper limit value has been decreased.

2. The knocking control system for the gas engine including a plurality of cylinders for power generation according to claim 1, wherein
the engine load controller controls the gas engine so that the power output measurement value of the as engine is close to a power output set value input via the power output limiter.

3. The knocking control system for the gas engine including a plurality of cylinders for power generation according to claim 1,
wherein the counter calculator resets the counter to an initial value when the power output limiter decreases the total power output upper limit value.

4. The knocking control system for the gas engine including a plurality of cylinders for power generation according to claim 1,
wherein the power output reduction controller stops the control for reducing the power output of the cylinder based on the counter if the counter does not reach a value that is greater than or equal to the threshold for a predetermined time after starting the control.

* * * * *